United States Patent [19]
Yoshino et al.

[11] Patent Number: 5,914,555
[45] Date of Patent: Jun. 22, 1999

[54] ULTRASONIC MOTOR

[75] Inventors: Tomoyuki Yoshino; Hironobu Itoh; Makoto Suzuki; Masao Kasuga, all of Chiba, Japan

[73] Assignee: Seiko Instruments Inc., Chiba, Japan

[21] Appl. No.: 08/766,038

[22] Filed: Dec. 16, 1996

[30] Foreign Application Priority Data

Dec. 14, 1995 [JP] Japan ................................. 7-326027

[51] Int. Cl.$^6$ ................................................. H01L 41/04
[52] U.S. Cl. ........................... 310/323; 310/317; 310/316
[58] Field of Search .................... 310/323, DIG. 6, 310/317, 363, 67 R, 71, 268, 316

[56] References Cited

U.S. PATENT DOCUMENTS

| | | | |
|---|---|---|---|
| 3,684,905 | 8/1972 | Martyn | 310/8.2 |
| 4,363,993 | 12/1982 | Nishigaki et al. | 310/332 |
| 4,689,023 | 8/1987 | Strong, III et al. | 439/189 |
| 4,734,608 | 3/1988 | Takoshima | 310/313 R |
| 4,763,148 | 8/1988 | Tsukimoto et al. | 354/195.1 |
| 4,868,637 | 9/1989 | Clements et al. | 357/72 |
| 5,053,669 | 10/1991 | Saeki et al. | 310/323 |
| 5,247,220 | 9/1993 | Miyazawa et al. | 310/323 |
| 5,592,041 | 1/1997 | Kasuga et al. | 310/316 |

Primary Examiner—Clayton LaBalle
Assistant Examiner—Timothy A. Williams
Attorney, Agent, or Firm—Loeb & Loeb LLP

[57] ABSTRACT

An ultrasonic motor in which a voltage is applied to a piezoelectric element by using a lead board. To fabricate the motor in a simplified manner, it is so constructed that a plurality of conductive patterns on the lead board are joined to a plurality of electrodes formed on the piezoelectric element by solder or the like, the piezoelectric element and the lead board are prevented from contacting each other by bending the conductive patterns to form a gap, then a voltage is applied to the lead board, thereby realizing the drive.

11 Claims, 7 Drawing Sheets

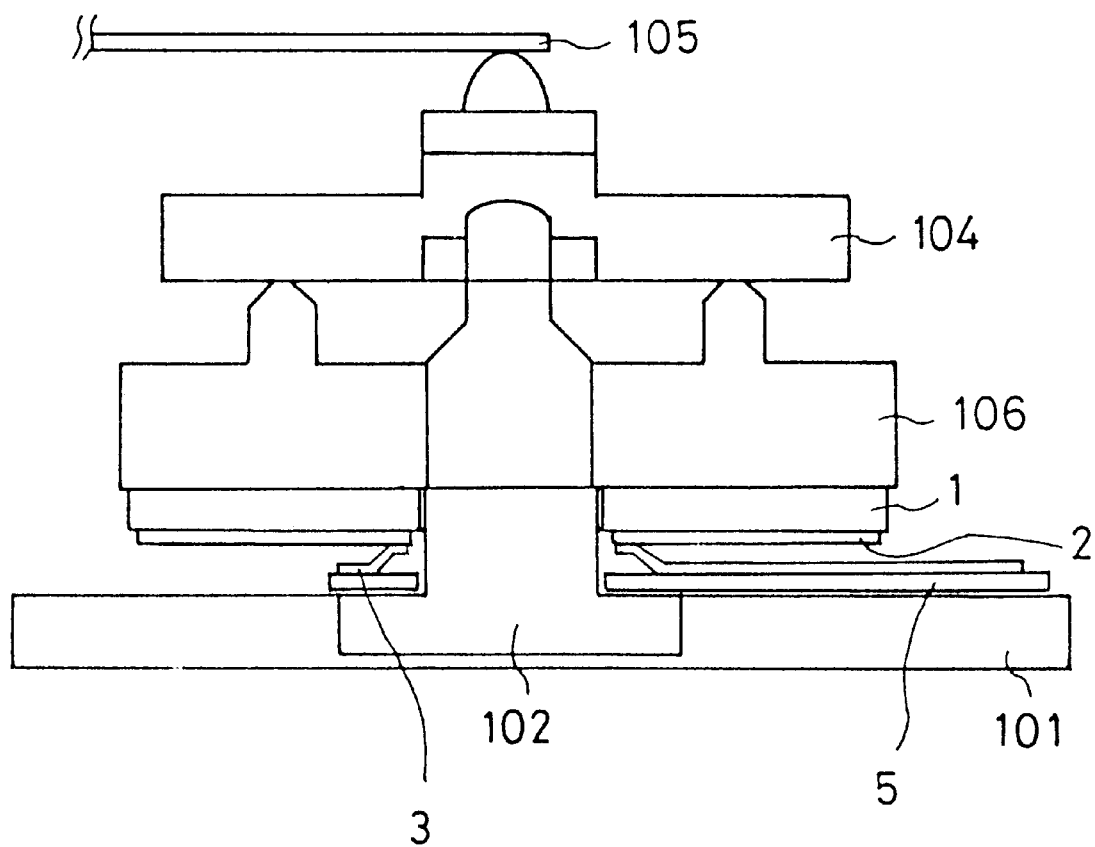
F I G. 2

ULTRASONIC MOTOR

BACKGROUND OF THE INVENTION

The present invention relates to an ultrasonic motor having an electrical connecting construction for a piezoelectric element for friction-driving a moving body by a vibration wave utilizing an expansion/contraction movement of the piezoelectric element.

An electrical connecting construction for a piezoelectric element in a conventional ultrasonic motor, as shown in FIG. 7, is one in which a plurality of lead wires 7 are connected to a plurality of electrodes 2 formed on a piezoelectric element 1. Soldering is a representative method of connecting wires 7 to electrodes 2. That is, the lead wires 7 are joined to the electrodes 2 formed on a surface of the piezoelectric element 1 by solder joints 8.

However, in the construction of the conventional ultrasonic motor, since the plurality of lead wires 7 are connected to the electrodes 2 formed on the surface of the piezoelectric element 1 one by one, considerable time is required to connect the lead wires, which results in an increase in production cost.

In addition, in a case where the ultrasonic motor is miniaturized, a degradation in operating characteristics and the increase in cost become substantial due to the manner of connecting the plurality of lead wires 7.

Also, the strength of the connections between the lead wires 7 and the electrodes 2 is low, and this creates problems with respect to reliability.

Furthermore, since the lead wires 7 are joined the electrodes 2 one by one by soldering and the like, the time period during which the element receives heat becomes long and this has a harmful influence on the polarized state of the piezoelectric element 1.

FIG. 8 is a sectional view of an ultrasonic motor according to the prior art. Piezoelectric element 1 is joined to a vibrating body 106 and a plurality of electrodes 2 are pattern-formed on piezoelectric element 1. The vibrating body 106 is guided by a center shaft 102 and is supported fixedly on the center shaft 102 in the vicinity of the center thereof so as to be assembled with the fixed bed 101 on which the lead board 5 is arranged. A moving body 104 is guided by a center shaft 102 for rotation relative to center shaft 102 and the body 104 is capable of rotating by contacting a vibrating body 106 with a predetermined pressure produced by a pressing member 105 that bears against body 104 at a point along the axis of shaft 102. An elastic body such as a coil, a spring, a plate spring, etc., may be employed as the pressing member 105, and several such bodies may be used jointly.

SUMMARY OF THE INVENTION

It is therefore an object of the present invention to provide an ultrasonic motor of a small-size and a high reliability, in which reliable connections are made to the piezoelectric element with the aid of a lead board.

In order to solve the above and other objects, the present invention is so adapted that conductive patterns do not contact the piezoelectric element to leak the electrical signal, even if the lead board is deformed due to external forces.

Also, the conductive patterns on the lead board are adapted to all be connected to the piezoelectric element simultaneously.

According to the present invention, an electrical connection is performed by contacting electrodes formed on a surface of a piezoelectric element and conductive patterns disposed together on the lead board to each other.

The conductive patterns joined to the electrodes on the surface of the piezoelectric element are constructed to be bent and then mounted, and to ensure a gap between the piezoelectric element and the lead board.

Also, a predetermined connecting strength can be obtained by fixing a connected portion by an adhesive and the like, thereby improving the reliability.

Further, the adhesive is coated on the connected portion of the electrodes to be hardened, thereby improving the strength of the resulting connections.

Furthermore, an insulating layer is also formed on the conductive patterns, such that the conductive patterns do not contact to the electrodes on the surface of piezoelectric element if the lead board is deformed by external forces.

BRIEF DESCRIPTION OF THE DRAWINGS

FIG. 2 is a sectional view showing one form of construction of an ultrasonic motor according to the embodiment of FIG. 1.

DESCRIPTION OF THE PREFERRED EMBODIMENTS

An embodiment according to the present invention will be described hereinafter with reference to the drawings.

Figure 1:
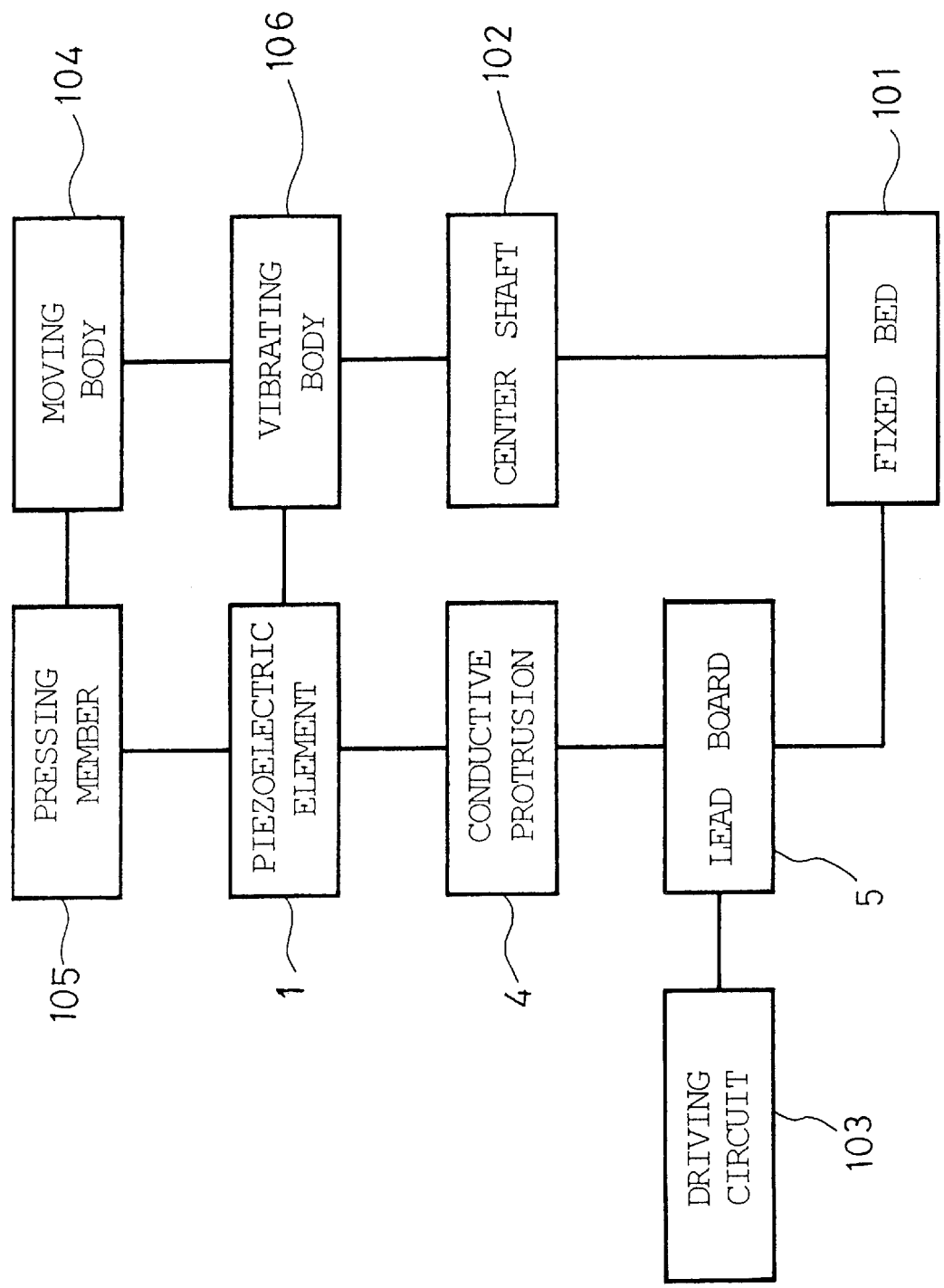
FIG. 1 is a diagrammatic block diagram showing an embodiment of an ultrasonic motor according to the present invention.

FIG. 1 is a schematic block diagram showing an embodiment of an ultrasonic motor according to the present invention, and FIG. 2 is a sectional view of one form of construction of an ultrasonic motor according to the embodiment of FIG. 1.

Referring to FIGS. 1 and 2 together, a lead board 5 is disposed on a fixed bed 101. A piezoelectric element 1 is joined to a vibrating body 106 and a plurality of electrodes 2 are pattern-formed on piezoelectric element 1. The vibrating body 106 is guided by a center shaft 102 and is supported fixedly on the center shaft 102 in the vicinity of the center of body 106 so as to be assembled with the fixed bed 101 on which the lead board 5 is arranged. Before assembly in the motor, the lead board 5 is provided with conductive patterns 3 for contacting the plurality of electrodes 2 formed on the piezoelectric element 1.

A moving body 104 is guided by center shaft 102 for rotation relative to center shaft 102 and body 104 is capable of rotating by contacting vibrating body 106 with a predetermined pressure produced by a pressing member 105 that bears against body 104 at a point along the axis of shaft 102. An elastic body such as a coil, a spring, a plate spring, etc., may be employed as the pressing member 105, and several such bodies may be used jointly.

In a case where joining elements 4 (FIG. 6) are used for bonding patterns, or leads, 3 to electrodes 2, a three-layer film made of gold, nickel and chromium is used for the electrodes 2 formed on a surface of the piezoelectric element 1.

However, in a case where another joining layer is used therefor, not only the three-layers-film but also various electrode materials, such as aluminum, gold, silver, copper, etc., can be selectively used.

Figure 3:
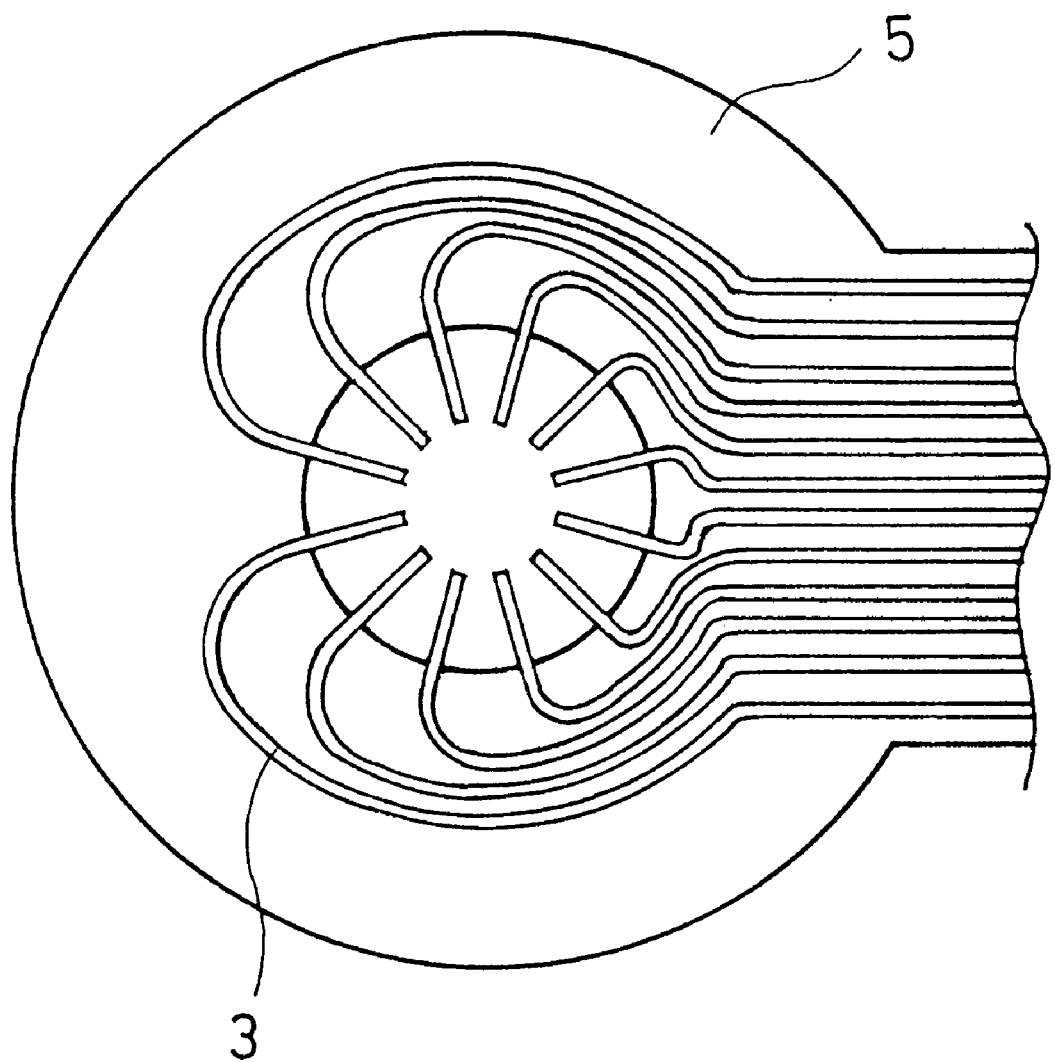
FIG. 3 is a plan view of a lead board according to the present invention.

FIG. 3 is a plan view of the lead board 5 according to the present invention. The lead board 5 is made of polyimide etc., and the conductive patterns 3 are formed thereon. The conductive patterns 3 are formed so as to protrude into a region enclosed by the polyimide board 5, serving as a base, as shown in FIG. 3. The illustrated embodiment has twelve internally protruding conductive patterns 3.

Figure 4:
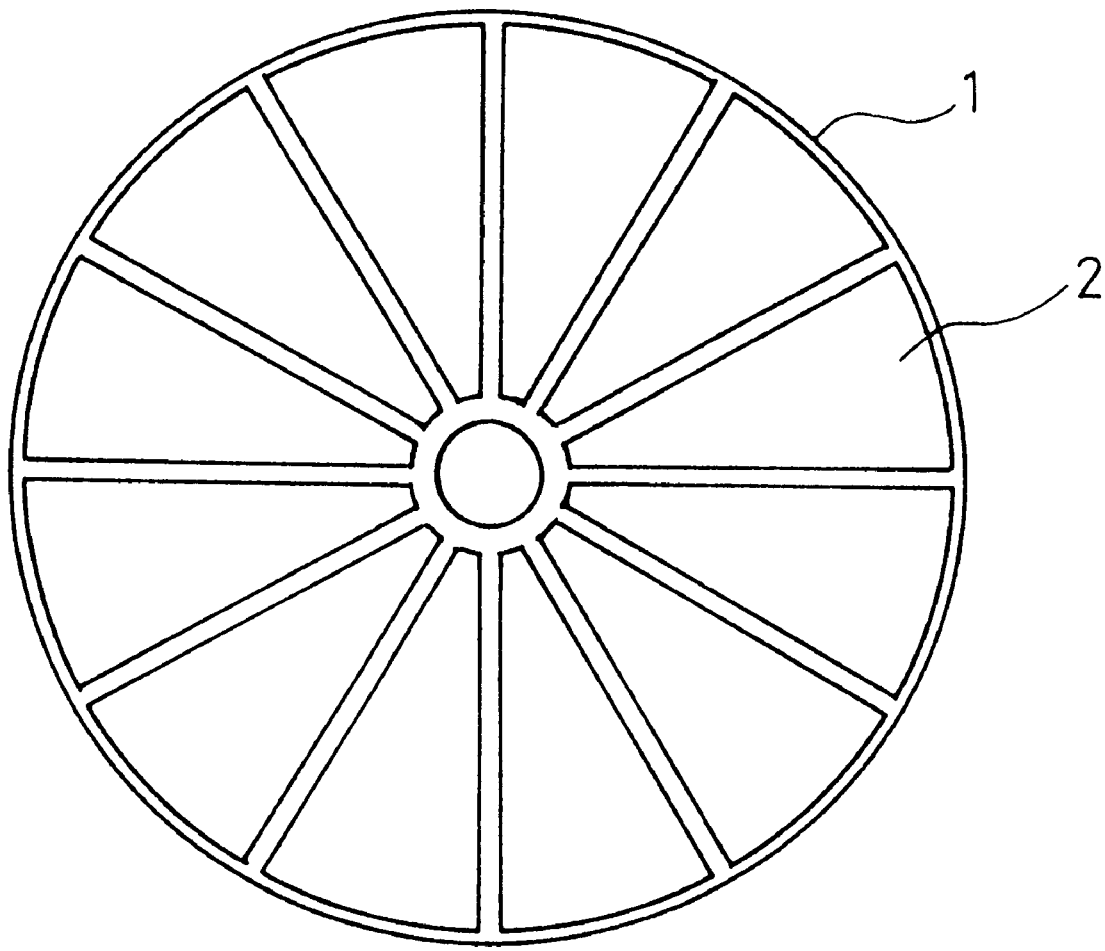
FIG. 4 shows one exemplary shape of electrodes on a piezoelectric element according to the present invention.

The twelve protruding conductive patterns 3 are correspondingly joined to the electrodes 2 which are formed on the surface of the piezoelectric element 1 shown in FIG. 4.

Figure 5:
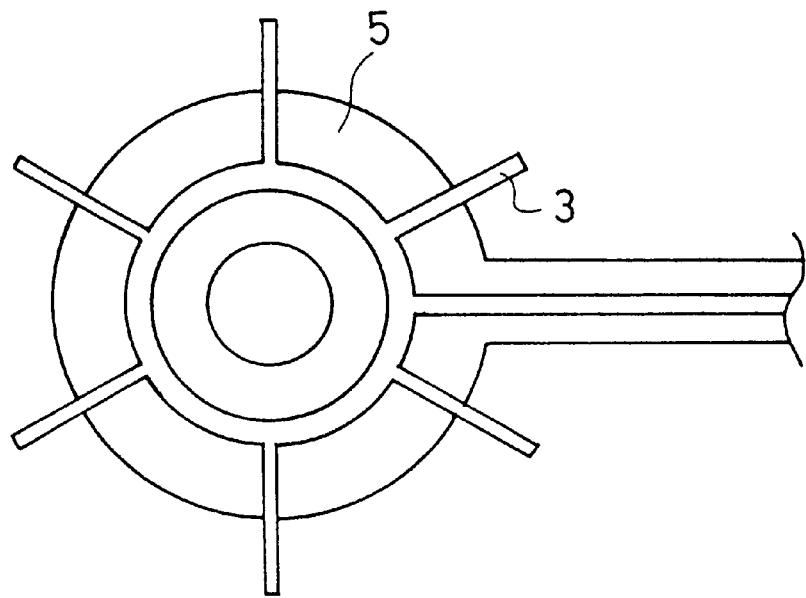
FIG. 5 is a plan view of a lead board according to the present invention.

There is shown in FIG. 5 a plan view of another embodiment of a lead board according to the present invention. The lead board 5 comprises polyimide etc., and a conductive pattern 3 are formed thereon. The conductive pattern is formed so as that electrode connection portions protrude outside the polyimide used as the base. The conductive pattern shown in FIG. 5 is used when electrodes 2 are supplied with the same signal alternatively. Sometimes, one group of electrodes is not supplied with a signal. When two groups of electrodes are to be supplied with different signals, two conductive patterns 3 will be provided.

Figure 6:
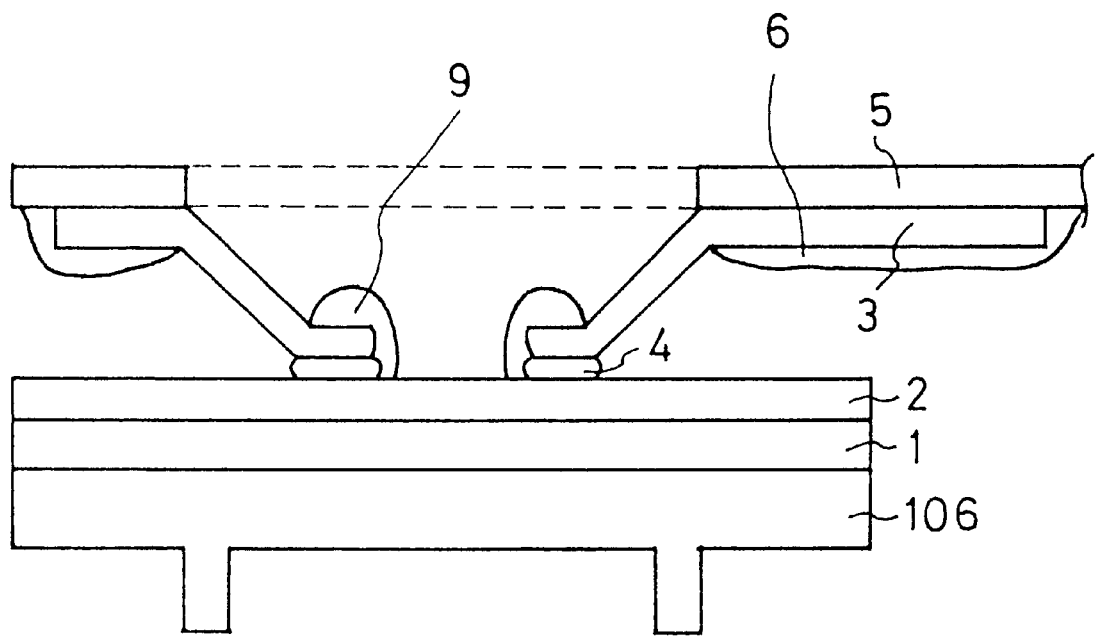
FIG. 6 is a sectional view showing the lead board joined to the electrodes on a surface of the piezoelectric element.
Figure 7:
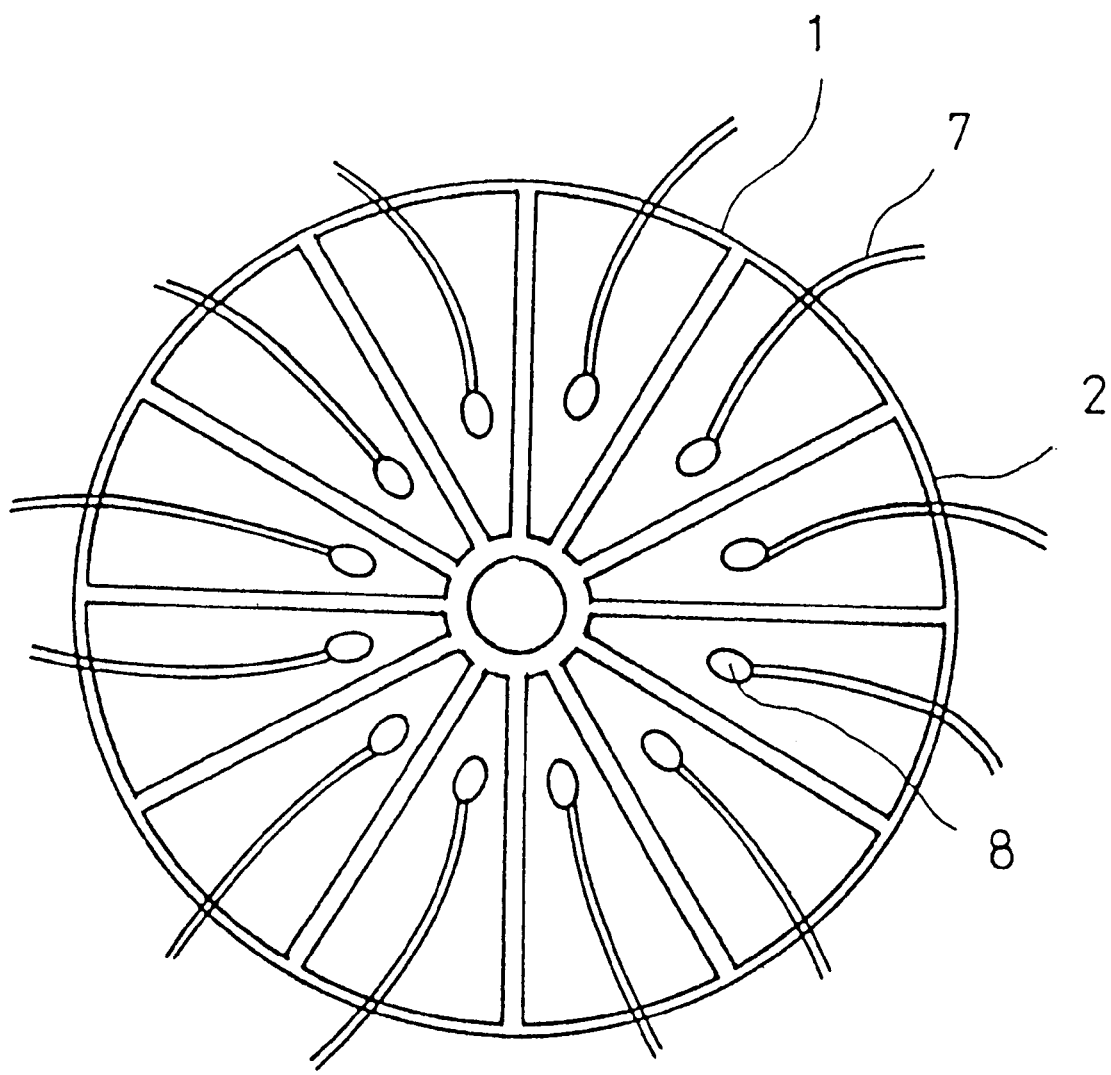
FIG. 7 is a plan view in a joined state of lead wires of an ultrasonic motor according to the prior art.
Figure 8:
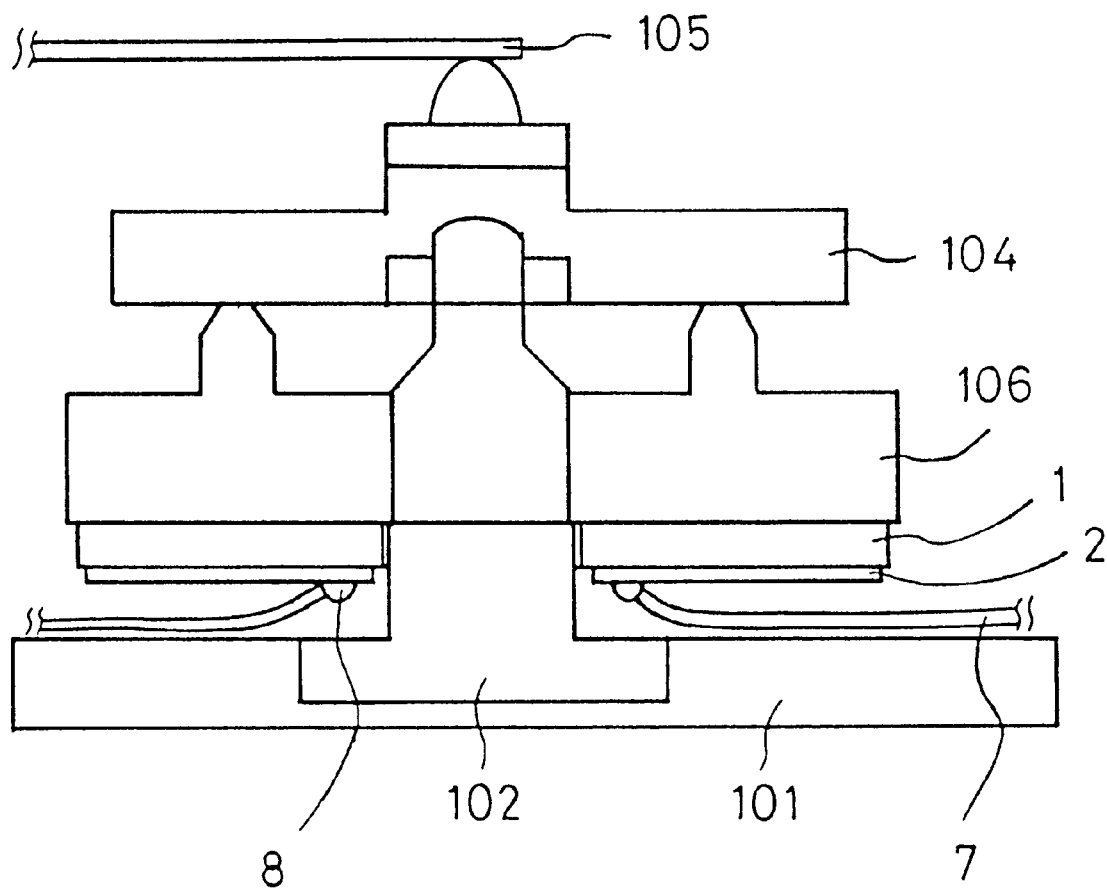
FIG. 8 is a sectional view of an ultrasonic motor according to the prior art.

FIG. 6 is a sectional view in a case where the lead board 5 shown in FIG. 3 and the piezoelectric element 1 shown in FIG. 4 are joined to each other. The conductive patterns 3 formed on the surface of the lead board 5 are bent away from the plane of lead board 5 and are joined to the electrodes 2 of piezoelectric element in this state. There can be formed a gap between the piezoelectric element and the lead board 5 by so bending the conductive patterns 3, so that the lead board 5 can be mounted above electrodes the 2 without affecting the vibration of piezoelectric element 1.

An insulating layer 6 is coated on the conductive patterns 3 in order to prevent conduction when some external forces are applied to lead board 5 and the conductive patterns 3 contact to the electrodes 2.

Also, even if lead board 5 is mounted so as to be turned upside down, and the configuration shown in FIG. 2 is employed, a metal can be used as the material of the fixed bed by forming the insulating layer.

Solder beads or protrusions, a conductive adhesive, a conductive film, etc., can be used for the joint layer 4.

Generally, a thermo-pressure bonding is employed for the joining, no matter what adhesive layer is used.

For example, in a case where solder is employed, the conductive patterns 3 are joined to the electrodes 2 by applying heat create a temperature of 200° C. to 300° C. while applying a bonding force not greater than 10 kgf. Also, in the case where the joining is carried out using solder, a plating treatment can be performed in connection with producing the lead board, so that an adhesive for the conducting and the joining need not to be coated at the mounting process, which results in a simplification of the processes.

Further, an adhesive 9 is coated on the connected portions and is hardened, thereby achieving a firm connection. In a case where the adhesive is used, there can be obtained a connecting strength more than ten times that exhibited in a case where the adhesive is not used.

An ultraviolet hardening type adhesive is suitable as the adhesive used in this case, which can be hardened within a few seconds without imposing a high temperature on the piezoelectric element.

Also, an adhesive of an epoxy system which hardens at a low temperature can be used.

If the adhesive hardening temperature is too high, a polarized state of the piezoelectric element is eliminated. Accordingly, it is desirable that the hardening temperature be low.

In an ultrasonic motor according to the present invention, electrical conduction can be carried out by joining conductive patterns 3 formed on lead board 5 to electrodes 2 formed on the surface of piezoelectric element 1 and the attachment of individual lead wires becomes unnecessary, thereby facilitating a miniaturization of the ultrasonic motor and substantially reducing the working time required for making the electrical connections.

Also, the lead board 5 and piezoelectric element 1 are joined so strongly that there can be solved the problem resulting from a separation etc., of the lead wires and improved reliability. Moreover, the effects due to the heat applied during joining lead wires is eliminated and the vibrating characteristic of the piezoelectric element becomes stable. Furthermore, it becomes unnecessary to limit the kind of the electrode material formed on the surface of the piezoelectric element, which brings about a wide range of choices for the electrode material.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An ultrasonic motor comprising:
   a moving body;
   a piezoelectric element for friction-driving said moving body by a vibration wave utilizing expansion/contraction movements of said piezoelectric element, said piezoelectric element having a surface provided with electrodes for receiving a driving voltage,;
   a fixed bed;
   a center shaft extending from said fixed bed and guiding said moving body so that said moving body is rotatable relative to said center shaft;
   a vibrating body surrounding, and supported fixedly on, said center shaft, said vibrating body carrying said piezoelectric element;
   a lead board having an interior edge which encloses a through hole, wherein said center shaft extends through said through hole;
   conductive patterns formed on said lead board for applying the driving voltage to said electrodes, said conductive patterns having free ends which protrude inwardly past said interior edge and which conductively contact said electrodes and said conductive patterns having portions which include said free ends and which are bent away from said lead board so that when said free ends conductively contact said electrodes, said lead board is spaced from said piezoelectric element;

a conductive layer which is formed between and affixes the conductive patterns of the lead board and the electrodes of the piezoelectric element; and an adhesive coated on said conductive patterns and hardended thereon to provide a high strength connection between said conductive patterns and said electrodes.

2. An ultrasonic motor as claimed in claim 1, wherein said adhesive is an ultraviolet hardening adhesive.

3. An ultrasonic motor as claimed in claim 1, wherein said adhesive comprises an adhesive of an epoxy system which hardens at a temperature of from 60° C. to 100° C.

4. An ultrasonic motor as claimed in claim 1, further comprising an insulating layer formed on portions of said conductive patterns which are on said lead board.

5. An ultrasonic motor having a piezoelectric element for friction-driving a moving body by a vibration wave utilizing expansion/contraction movements of the piezoelectric element, the piezoelectric element having a surface provided with electrodes for receiving a driving voltage, wherein said motor comprises:

a lead board having an outer edge;

conductive patterns formed on said lead board for applying the driving voltage to said electrodes, said conductive patterns having free ends which protrude outwardly past said outer edge in directions which are angularly offset from one another and which conductively contact said electrodes and said conductive patterns having portions which include said free ends and which are bent away from said lead board so that when said free ends conductively contact said electrodes, said lead board is spaced from said piezoelectric element; and an adhesive coated on said conductive patterns and hardended thereon to provide a high strength connection between said conductive patterns and said electrodes.

6. An ultrasonic motor as claimed in claim 5, further comprising solder bodies connecting said conductive patterns to said electrodes.

7. An ultrasonic motor as claimed in claim 5, wherein said adhesive is an ultraviolet hardening adhesive.

8. An ultrasonic motor as claimed in claim 5, wherein said adhesive comprises an adhesive of an epoxy system which hardens at a temperature of from 60° C. to 100° C.

9. An ultrasonic motor as claimed in claim 5, further comprising an insulating layer formed on portions of said conductive patterns which are on said lead board.

10. An ultrasonic motor comprising:

a moving body;

a piezoelectric element for friction-driving said moving body by a vibration wave utilizing expansion/contraction movements of said piezoelectric element, said piezoelectric element having a surface provided with electrodes for receiving a driving voltage,;

a fixed bed;

a center shaft extending from said fixed bed and guiding said moving body so that said moving body is rotatable relative to said center shaft;

a vibrating body surrounding, and supported fixedly on, said center shaft, said vibrating body carrying said piezoelectric element;

a lead board having an outer edge; and conductive patterns formed on said lead board for applying the driving voltage to said electrodes, said conductive patterns having free ends which protrude outwardly past said outer edge in directions which are angularly offset from one another and which conductively contact said electrodes and said conductive patterns having portions which include said free ends and which are bent away from said lead board so that when said free ends conductively contact said electrodes, said lead board is spaced from said piezoelectric element.

11. An ultrasonic motor of claim 10, further including a conductive layer which is formed between and affixes the conductive patterns of the lead board and the electrodes of the piezoelectric element.

* * * * *